United States Patent
Kok Chong et al.

(10) Patent No.: US 10,455,886 B2
(45) Date of Patent: Oct. 29, 2019

(54) EPOXIDISED NATURAL RUBBER BASED BLEND FOR ANTISTATIC FOOTWEAR APPLICATION

(71) Applicants: Yong Kok Chong, Kuala Lumpur (MY); Ahmad Mohamad Asri, Kuala Lumpur (MY)

(72) Inventors: Yong Kok Chong, Kuala Lumpur (MY); Ahmad Mohamad Asri, Kuala Lumpur (MY)

(73) Assignee: LEMBAGA GETAH MALAYSIA, Kuala Lumpur (MY)

( * ) Notice: Subject to any disclaimer, the term of this patent is extended or adjusted under 35 U.S.C. 154(b) by 41 days.

(21) Appl. No.: 15/272,423

(22) Filed: Sep. 21, 2016

(65) Prior Publication Data

US 2017/0006957 A1  Jan. 12, 2017

Related U.S. Application Data (62) Division of application No. 14/004,147, filed as application No. PCT/MY2012/000046 on Mar. 7, 2012, now Pat. No. 9,833,034.

(51) Int. Cl.

| C08L 15/00 | (2006.01) |
| A43B 1/10 | (2006.01) |
| A43B 7/36 | (2006.01) |
| C08K 3/04 | (2006.01) |
| C08J 3/22 | (2006.01) |
| C08J 3/24 | (2006.01) |
| A43B 17/00 | (2006.01) |
| C08C 19/06 | (2006.01) |

(52) U.S. Cl.
CPC ............... *A43B 1/10* (2013.01); *A43B 7/36* (2013.01); *A43B 17/006* (2013.01); *C08J 3/22* (2013.01); *C08J 3/247* (2013.01); *C08K 3/04* (2013.01); *C08C 19/06* (2013.01); *C08J 2307/00* (2013.01)

(58) Field of Classification Search
CPC .... C08J 3/22; C08J 3/247; C08K 3/04; C08C 19/06
USPC ........................................................ 523/351
See application file for complete search history.

(56) References Cited

U.S. PATENT DOCUMENTS

| 2,261,072 | A | 10/1941 | Monahan |
| 4,127,552 | A | 11/1978 | Bidston et al. |
| 4,861,805 | A | 8/1989 | Saavedra et al. |
| 5,233,769 | A | 8/1993 | Weber |
| 5,319,867 | A | 6/1994 | Weber |
| 5,426,870 | A | 6/1995 | Purnell et al. |
| 7,424,782 | B2 | 9/2008 | Cheskin |
| 9,833,034 | B2 * | 12/2017 | Kok Chong ............. A43B 7/36 |
| 2002/0123564 | A1 * | 9/2002 | Obrecht ................. C08G 18/69 525/30 |
| 2003/0092801 | A1 * | 5/2003 | Agostini ................ C08K 5/548 524/27 |
| 2003/0130401 | A1 * | 7/2003 | Lin ......................... C08L 21/00 524/492 |
| 2017/0009029 | A1 * | 1/2017 | Kok Chong ............. C08K 3/04 |

FOREIGN PATENT DOCUMENTS

| JP | 10-025353 A | 1/1998 |
| WO | WO 92/20249 A1 | 11/1992 |

OTHER PUBLICATIONS

I.R. Gelling, Journal of Natural Rubber Research, vol. 6(3), 1991.

* cited by examiner

*Primary Examiner* — Hannah J Pak
(74) *Attorney, Agent, or Firm* — Steven M. War, Esq.; McNeeley, Hare & War LLP (57) ABSTRACT

Electrically conductive vulcanized epoxidized natural rubber [ENR]-carbon black blends can be produced by using either internal mechanical mixing method or open milling method. These two methods are commercially friendly due to their practicability and high production rate. The addition of vulcanization system, either sulfur or peroxide type does not affect the electrical properties of the vulcanized blends. All vulcanized blends prepared in this innovation show useful electrical properties with electrical volume resistances as low as the order of $10^1$ ohms. All these vulcanized blends also exhibit good mechanical properties with tensile strengths up to 26.0 MPa and Dunlop rebound resiliencies of 14.0% (i.e. high damping property). The black color level of all these vulcanized blends is adjustable. As a result of good electrical and mechanical properties (especially high damping property), they have good potential to be used for antistatic footwear manufacturing and application.

20 Claims, 3 Drawing Sheets

EPOXIDISED NATURAL RUBBER BASED BLEND FOR ANTISTATIC FOOTWEAR APPLICATION

FIELD OF INVENTION

The present invention relates to electrically conductive vulcanised-epoxidised natural rubber (ENR)-carbon black blend targeted for antistatic footwear application and method of preparation of the same.

BACKGROUND OF INVENTION

Accumulated electrostatic charges on the high sensitive electronic components (e.g. computer integrated circuits, magnetic tape or disk and etc) are facing the difficulty of draining off to ground when they are placed on the surface of a good electrical insulator (such as wood, rubber and plastic). On the other hand, if these components are in contact with a good electrical conductor (i.e. metallic material), electrostatic will be discharged from them through the conductor in a very high rate and subsequently causes the unwanted current sparks. Both of these phenomenons can cause permanent damage to all these sensitive and expensive electronic components.

People manufacturing the sensitive electronic components are the most significant source of static electricity. As the result, it is essential to discharge static electricity from people who may come in contact with these sensitive electronic components. Working areas where which such sensitive electronic components are manufactured must have a grounded floor or grounded mats which are able to discharge the electrostatic from people walking on the floor or mats by conducting the static electricity from the people to the ground. The only contact people have with the floor is usually through their shoe soles. The conventional shoe soles (made from various types of electrical insulator) do not readily discharge static electricity from the body of the person to the floor. Therefore, it is necessary to have a pair of antistatic or electrically conductive shoes (which include their antistatic or electrically conductive soles) that can effectively discharge the accumulated static electricity from the person body (by creating an electrical conduit).

Technology of antistatic and electrically conductive footwear fabrication is well-established and it can be traced back to year 1941 [U.S. Pat. No. 2,261,072]. Majority of the antistatic, electrostatic dissipative and electrically conductive footwear available in the current market are produced with soles made from synthetic polymers or blends of synthetic and natural polymers.

U.S. Pat. Nos. 4,861,805 and 5,426,870 both disclosed antistatic shoe outer-soles could be made from polyurethane. Antistatic shoes with inner-soles and outer-soles made from vinyl chloride copolymer composition were reported respectively by U.S. Pat. Nos. 5,319,867 and 4,127,552. U.S. Pat. No. 5,426,870 also described antistatic shoe inner-sole that was made by using blend of natural rubber (non-chemically modified type) and styrene butadiene copolymer. Antistatic shoe soles (both outer and inner types) made from synthetic polymers were claimed to be lighter in weight, longer lasting and non-marking on floors if compared to natural rubber based shoe soles. However, it is also known that shoe soles made from all these synthetic polymers have shown some disadvantages, e.g. poor and inhomogeneous fillers dispersion for polyurethane based compositions, quick ageing problem for polyester based polyurethane due to hydrolysis (reaction with water) and also hard thermoplastic materials that reduce shoes wearers comfort.

All these synthetic polymers (i.e. polyurethane, vinyl chloride copolymer and styrene butadiene copolymer) used to manufacture antistatic and electrically conductive shoe soles are categorised as good electrical insulator in their virgin form. They could be turned into electrical conductors by addition of several types of conductive filler. The most common used electrically conductive fillers for antistatic, electrostatic dissipative and electrically conductive shoe soles manufacturing are carbon blacks [U.S. Pat. Nos. 5,233,769, 5,426,870, 5,319,867 and 7,424,782 B2].

SUMMARY OF THE INVENTION

It is according to one aspect of the present invention to provide an epoxidised natural rubber [ENR] based blend for antistatic footwear application comprising; epoxidised natural rubber [ENR], carbon blacks, antioxidants, processing oils, processing waxes and vulcanisation agents.

Vulcanisation accelerators, vulcanisation activators and vulcanisation coagents are selectively added to the ENR based blend in order to accelerate, activate and enhance the blend's vulcanisation process. Whitening agents are also selectively added for adjusting the level of black colour of the ENR based blend.

Accordingly, the present invention attempts to tackle one or more of the problems mentioned in the background section. The provision of the epoxidised natural rubber [ENR] is advantageous as it is environmentally friendly and sustainable since it is sourced from the *Hevea Braziliensis* trees. Several other advantages [as reported by I. R. Gelling, *Journal of Natural Rubber Research*, 1991] can also be obtained by using epoxidised natural rubber based compound, i.e. good dispersion level of fillers, high damping (i.e. increased shock absorption ability as an advantageous for shoe sole manufacturing), good tensile properties, good oil resistance, improved oxidation resistance and high abrasion resistance (an indication of good wear resistance). Reasonable light-weight antistatic footwear can be manufactured by adjusting the thickness of the epoxidised natural rubber based shoe sole (since the electrical conductivity of the shoe sole is not affected by its thickness).

According to second aspect of the present invention, there is provided an internal mechanical mixing method for preparation of epoxidised natural rubber based blends by using internal mechanical mixing device and open milling device. This method comprising the steps of:
(a) adding epoxidised natural rubber to an internal mechanical mixing device;
(b) mixing of epoxidised natural rubber with carbon blacks, processing oils, processing waxes, and antioxidants by using an internal mechanical mixing device to produce masterbatch;
(c) discharge of the masterbatch, comprising of epoxidised natural rubber, carbon blacks, processing oils, processing waxes, antioxidants and vulcanisation activators (if added) from the internal mechanical mixing device;
(d) mixing of masterbatch with vulcanisation agents by using an open milling device to produce blend;
(e) discharging of the blend from the open milling device; and
(f) vulcanisation of the blend by either heating or microwave.

Accordingly, wherein step (b) further comprising the step of adding vulcanisation activators.

Accordingly, wherein step (d) further comprising the step of adding either vulcanisation accelerators or vulcanisation coagents or whitening agents or in any combination thereof.

According to third aspect of the present invention, there is provided an open milling method for preparation of epoxidised natural rubber based blends by using only open milling device. This method comprising the steps of:
  (a) adding epoxidised natural rubber to an open milling device
  (b) mixing epoxidised natural rubber with carbon blacks, processing oils, processing waxes and antioxidants by using an open milling device to produce masterbatch
  (c) mixing of the masterbatch with vulcanisation agents by using an open milling device to produce blend
  (d) discharge of the blend from the open milling device; and
  (e) vulcanisation of the blend by either heating or microwave.

Accordingly, wherein step (b) further comprising the step of adding vulcanisation activators to the masterbatch.

Accordingly, step (c) further comprising the step of adding either vulcanisation accelerators or vulcanisation coagents or whitening agents or in any combination thereof.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

Definition
 1. Vulcanisation: as used herein the term means a process of crosslinking of a rubber's polymer chains
 2. Vulcanisation agent: as used herein the term means any chemicals (for examples, sulfur and peroxide) added to a rubber to create crosslinking reaction of the rubber's polymer chains
 3. Vulcanisation accelerator: as used herein the term means any chemicals added to the rubber as catalyst to accelerate vulcanisation reaction
 4. Vulcanisation activator: as used herein the term means any chemicals added to the rubber as catalyst to activate vulcanisation reaction
 5. Vulcanisation coagent: as used herein the term means any chemicals added to the rubber to enhance its polymer chains crosslinking efficiency and level
 6. Vulcanisation system: as used herein the term means a system that comprising of vulcanisation agents, vulcanisation accelerators, vulcanisation activators and vulcanisation coagents The present invention relates to an environmentally friendly and electrically conductive vulcanised epoxidised natural rubber (ENR) blend targeted for antistatic footwear (includes both inner- and outer-shoe soles) application and manufacturing. Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

The present invention also describes two methods for preparation of vulcanised electrically conductive ENR based blend for antistatic footwear application, i.e. the internal mechanical mixing method and the open milling method. All vulcanised electrically conductive rubber blends in this present invention are based on ENR as the rubber host and carbon black as the only electrically conductive filler. These two major constituent materials in solid form are known to be highly processable with the help of some common mechanical mixing devices, such as internal mechanical mixing device (refer to FIG. 2) and open milling device (refer to FIG. 3). The level of black colour of all vulcanised electrically conductive ENR based blends in this present invention is also adjustable with the inclusion of whitening agents.

In view of problems such as material sustainability issue, poor fillers dispersion, low ageing resistance and also low comfort level due to hard materials for synthetic polymer based blends, it is now able to demonstrate that the very low electrical resistances of the vulcanised (at temperature 150±50° C.) epoxidised natural rubber-carbon black blends (reaching at the order of $10^1$ ohms in term of volume resistance) can be produced directly by using either the internal mechanical mixing method or the open milling method, which are commercially friendly methods due to their practicability and high production rate. Processing aids such as oils and waxes are also introduced to the blends in order to enhance the processability and dispersion level of the carbon blacks within the solid ENR host matrixes.

Carbon blacks are common electrical conductive fillers and commercially available in different grades at reasonable market pricing. Potential commercial applications (such as for antistatic footwear products) with more interesting visual appearance (i.e. the adjustable level of black colour of the rubber blend due to the inclusion of whitening agent) can also be manufactured using this type of vulcanised ENR blend. Suitable methods for processing this type of vulcanised ENR based blend are including various types of rubber processing equipment, such as injection moulding, extrusion and hot press-moulding.

Masterbatches with different compositions of ENR, carbon black, antioxidants, processing oils, processing waxes and vulcanisation activators are prepared by using either an internal mechanical mixing device (at temperature of between 25 to 230° C., fill factor of between 0.60 to 0.90 and rotors speed of between 50-180 rounds per minute) or by using an open milling device (at temperature of between 25-230° C.) at the first stage of mixing process.

At the second stage of mixing, vulcanisation agents (either sulfur or peroxide), vulcanisation accelerators, vulcanisation coagents and whitening agents are added later (during the second stage of mixing process) to the masterbatch by using an open milling device (at temperature 30-70° C.) in order to avoid the premature vulcanisation problem that can cause hardening and reducing the processability of the produced ENR based blends.

The total mixing period to produce ENR based blend by using both types of methods is fallen between 3 to 60 minutes.

The vulcanisation process of all ENR based blends are performed at temperature ranges from 100-250° C. by either heating or microwave.

All vulcanised (at temperature 150±50° C.) ENR based blends (including 5.0 to 60.0 p.p.h.r. of carbon blacks) prepared by using either internal mechanical mixing method or open milling method exhibit low electrical resistances (with the range of order from $10^1$-$10^{10}$ ohms in term of volume resistances) and other good physical properties (with tensile strengths equal 16.0 to 26.0 MPa, elongations at break equal 140.0 to 680.0%, tear strengths equal 10.0 to 38.0 N/mm, hardness equals of Shore A 30.0 to 90.0, compression sets equal 8.0 to 65.0%, Dunlop rebound resiliencies equal 14.0 to 56.0% and Akron abrasions equal 4.0 to 50.0 $mm^3$/500 rev).

Mixing proportions and function of each of the raw materials, chemicals and processing devices used to produce the electrical conductive vulcanised ENR based blends are listed as following:

From hereinbelow, the preferred embodiments of the present invention will be discussed in relation to the accompanying FIGS. 1 to 3, which will be used independently or in any combination thereof.

Figure 1:
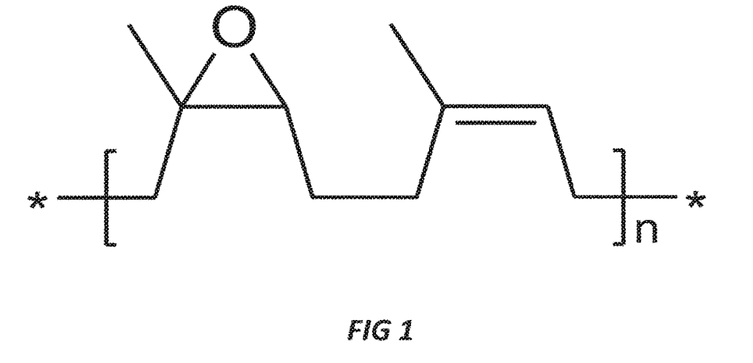
FIG. 1: illustrates the basic chemical structure of the smallest repeat unit of an epoxidised natural rubber example.

50.0 to 150.0 parts per hundred rubber (p.p.h.r.) of solid epoxidised natural rubber [ENR]-with refer to FIG. 1 (any grades with 10.0 to 60.0 mole % of epoxide contents) are used as the solid rubber host.

5.0 to 60.0 p.p.h.r. of carbon blacks (include grades of either reinforcing or semi-reinforcing or non-reinforcing or conductive blacks, all in either single or combination form of application) are used as the only electrically conductive fillers.

0.1 p.p.h.r to 10.0 p.p.h.r. of vulcanisation agents (selected from either sulfur or peroxide), 0 to 10.0 p.p.h.r. of vulcanisation accelerators, 0 to 12.5 p.p.h.r. of vulcanisation activators and 0 p.p.h.r. to 20.0 p.p.h.r. of vulcanisation coagents are used as the ingredients for all solid ENR based blends vulcanisation purpose.

0.1 to 20.0 p.p.h.r. of antioxidants (either staining or non-staining grades, all in either single or combination form of application) are included into all blends in the hope to enhance their oxidation resistance.

1.0 p.p.h.r. to 60.0 p.p.h.r. of processing oils (include types of either natural or synthetic oil, in either single or combination form of application) are added into all blends as processing aid in order to enhance the processability.

0.05 to 20.0 p.p.h.r. of processing waxes (include types of either natural or synthetic wax, in either single or combination form of application) are also added into all blends as processing aid in order to enhance the processability and dispersion level of the carbon blacks within the solid ENR host matrixes.

0 to 35.0 p.p.h.r. of whitening agents (either in solid or liquid form) are added for adjusting the level of black colour of the ENR based blend.

Internal mechanical mixing device (with refer to FIG. 2) is a general rubber or polymer processing device, which includes of some main structures in a closed system, i.e. a controllable moving (up and down movements) ram, a pair of rotating rotors (with controllable rotating speed) and equipped with a heating system in order to control the mixing chamber's temperature. Size of the device is varied and depends on the amount of material that is processed.

Open milling device (with refer to FIG. 3) is a general rubber processing device, which includes of main structures, i.e. two or more of counter or co-rotating rollers in an open system and is equipped with a heating system in order to control the rollers surfaces temperature. Size of the device is varied and depends on the amount of material that is processed.

Both open milling device and internal mechanical mixing device may be used independently or in any combination thereof.

The invention now being generally described, the same will be better understood by reference to the following detailed examples which are provided for purposes of illustration only and are not to be limiting of the invention unless so specified.

EXAMPLE 1

Formulation of Electrically Conductive Sulfur-vulcanised Epoxidised Natural Rubber [ENR]-Carbon Black Blends Vulcanised ENR-carbon black blend with various compositions of carbon black filler are prepared for the antistatic footwear application feasibility study (based on their selected electrical and physical properties). Examples of formulation for preparing the vulcanised ENR-carbon black blends are shown in Table 1.

TABLE 1

Formulations of Electrically Conductive Sulfur-Vulcanised Epoxidised Natural Rubber-Carbon Black Blends

| Raw material/ chemical | Part per hundred rubber [p.p.h.r.] | | | | | | |
|---|---|---|---|---|---|---|---|
| | Blend 1 | Blend 2 | Blend 3 | Blend 4 | Blend 5 | Blend 6 | Blend 7 |
| ENR 50 | 100.0 | 100.0 | 100.0 | 100.0 | 100.0 | 100.0 | 100.0 |
| Carbon black-XC 72 | 5.0 | 20.0 | 30.0 | 15.0 | 10.0 | 5.0 | 10.0 |
| Carbon black-N330 | 0.0 | 0.0 | 0.0 | 10.0 | 30.0 | 50.0 | 50.0 |
| Oil-Nytex 840 | 5.0 | 5.0 | 5.0 | 5.0 | 5.0 | 5.0 | 5.0 |
| Paraffin wax | 0.5 | 0.5 | 0.5 | 0.5 | 0.5 | 0.5 | 0.5 |
| Titanium dioxide | 5.0 | 5.0 | 5.0 | 5.0 | 5.0 | 5.0 | 5.0 |
| Antioxidant-Permanax WSL | 1.0 | 1.0 | 1.0 | 1.0 | 1.0 | 1.0 | 1.0 |
| Accelerator-Santocure NS | 1.6 | 1.6 | 1.6 | 1.6 | 1.6 | 1.6 | 1.6 |
| Zinc oxide | 5.0 | 5.0 | 5.0 | 5.0 | 5.0 | 5.0 | 5.0 |
| Stearic acid | 2.5 | 2.5 | 2.5 | 2.5 | 2.5 | 2.5 | 2.5 |
| Sulfur | 2.0 | 2.0 | 2.0 | 2.0 | 2.0 | 2.0 | 2.0 |

100.0 p.p.h.r of solid epoxidised natural rubbers (i.e. ENR 50 grade with 50.0±3.0 mole % of epoxide contents) are used as the only rubber host.

5.0 to 60.0 p.p.h.r. of carbon blacks, include grades of reinforcing [N330] and conductive black [XC 72] in either single or combination form of application are used as the only electrically conductive fillers.

2.0 p.p.h.r. of sulfurs are used as the vulcanising agent and 1.6 p.p.h.r. of Santocure NS (N-t-butyl-2-benzothiazole sulfenamide) as the favourable vulcanisation accelerators. Both 5.0 p.p.h.r. of zinc oxide and 2.5 p.p.h.r. of stearic acid are added as the vulcanisation activators.

1.0 p.p.h.r. of Permanax WSL (alpha-1-methyl cyclohexyl derivative of selected xylenols) is added as the antioxidant (a non-staining grade).

5.0 p.p.h.r. of Nytex 840 processing oil (a type of naphthenic synthetic processing oil) and 0.5 p.p.h.r. of paraffin wax are added as the processing aids.

5.0 p.p.h.r. of titanium dioxides are added as the whitening agent. The titanium dioxides used are in solid powder form.

EXAMPLE 2

Figure 2:
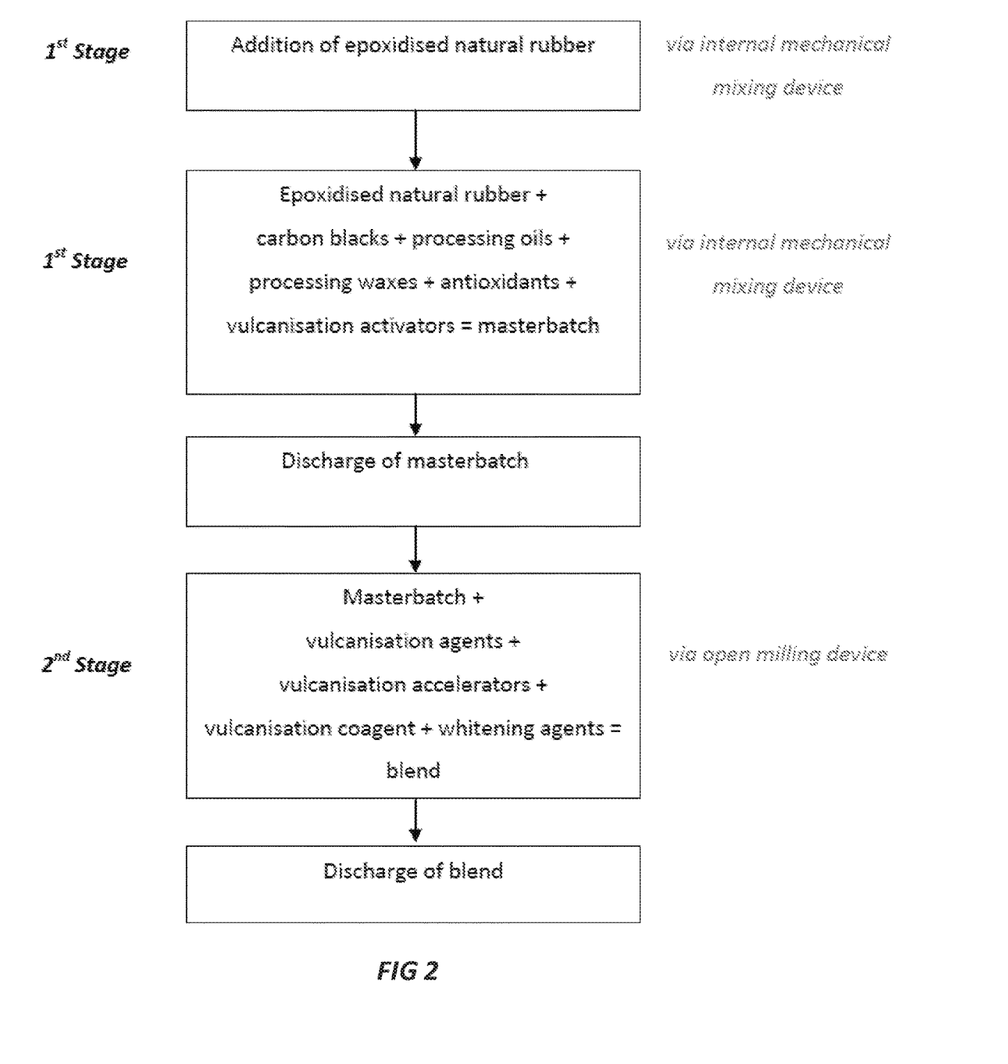
FIG. 2: illustrates exemplary flowchart of the first method of preparation of the epoxidised natural rubber based blend, namely the internal mechanical mixing method.

Preparation of Electrically Conductive Sulfur-vulcanisation System Containing Epoxidised Natural Rubber [ENR]-Carbon Black Blends by Using Internal Mechanical Mixing Method For the first stage of mixing, ENR-carbon black masterbatches with different proportions [in p.p.h.r.] of carbon blacks, Nytex 840, paraffin wax, Permanax WSL, zinc oxide and stearic acid (accordingly to the formulation as shown in Table 1 of Example 1) are prepared by using an internal mechanical mixing device (with refer to FIG. 2). A fill factor of 0.70 (from the total free volume of an internal mechanical mixing device's mixing chamber) is used to perform all mixings. The starting temperature for each mixing is 70° C. The rotor speed is 100 rounds per minute. Stages of each mixing are described in Table 2:

TABLE 2

First Stage of Preparation of ENR-Carbon Black Masterbatches by using the Internal Mechanical Mixing Method

| Stage of mixing | Timing |
| --- | --- |
| 1. Addition of ENR | $0^{th}$ minute |
| 2. Addition of carbon blacks, processing oil, wax, antioxidant and activators to produce masterbatch | $2^{nd}$ minute |
| 3. Discharge of masterbatch | $6^{th}$ minute (Total time = 6 minutes) |

For the second stage of mixing, 2.0 p.p.h.r. of sulfurs, 1.6 p.p.h.r. of Santocure NS and 5.0 p.p.h.r. of titanium dioxides are added to each of the ENR-carbon black masterbatches (with 5.0 to 60.0 p.p.h.r. of total carbon black) on a two-roll open milling device (with refer to FIG. 2) at temperature 30° C., with the nip's gap distance is adjusted to 2±0.2 mm. Each of the produced sulfur-vulcanisation system containing ENR-carbon black blends is then removed from the two-roll open milling device after 6 minutes of total mixing period. Prolonged mixing is not recommended at this stage in order to prevent premature vulcanisation.

EXAMPLE 3

Figure 3:
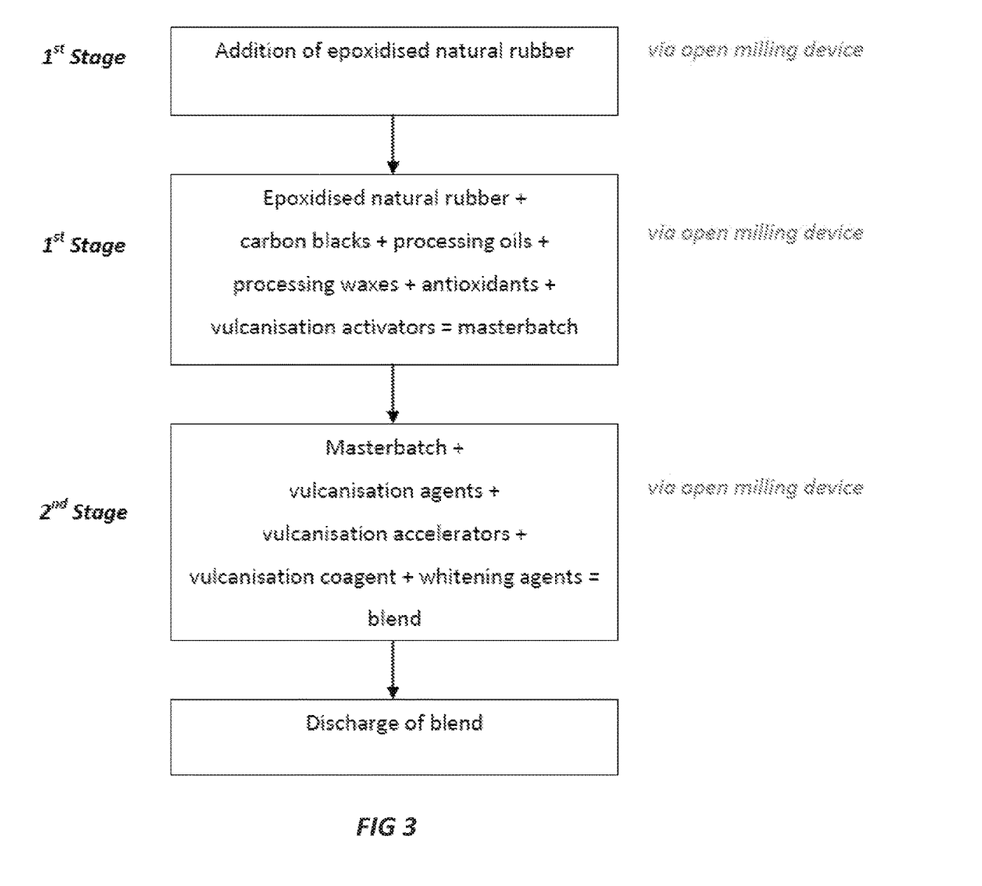
FIG. 3: illustrates exemplary flowchart of the second method of preparation of the epoxidised natural rubber based blend, namely the open milling method.

Preparation of Electrically Conductive Sulfur-vulcanisation System Containing Epoxidised Natural Rubber [ENR]-Carbon Black Blends by Using Open Milling Method ENR-carbon black blends with different proportions [in p.p.h.r.] of carbon blacks, Nytex 840, paraffin wax, Permanax WSL, zinc oxide, stearic acid, sulfur, Santocure NS and titanium dioxide (accordingly to the formulation as shown in Table 1 of Example 1) are prepared directly by using a two-roll open milling device (with refer to FIG. 3). The starting temperature for each mixing is 30° C. with the nip's gap distance is adjusted to 2±0.2 mm. Stages of each mixing are as described in Table 3:

Each of the sulfur-vulcanisation system containing ENR-carbon black blends is then removed from the two-roll open milling device after 16 minutes of total mixing period. Prolonged mixing shall be avoided in order to prevent premature vulcanisation.

TABLE 3

Stages of Preparation of Sulfur-Vulcanisation System Containing ENR-Carbon Black Blends by using the Open Milling Method

| Stage of mixing | Timing |
| --- | --- |
| Stage 1: | |
| 1. Addition of ENR | $0^{th}$ minute |
| 2. Addition of carbon blacks, processing oil, wax, antioxidant and activators to produce masterbatch | $2^{nd}$ minute |
| Stage 2: | |
| 3. Addition of sulfur, accelerator and whitening agent to produce blend | $10^{th}$ minute |
| 4. Discharge of blend | $16^{th}$ minute (Total time = 16 minutes) |

EXAMPLE 4

Preparation of Electrically Conductive Sulfur-vulcanised Epoxidised Natural Rubber [ENR]-Carbon Black Blends Each of the sulfur-vulcanisation system containing ENR-carbon black blends is prepared accordingly to Examples 1, 2 and 3. Appropriate amounts (varied with the targeted application and testing) of each of the sulfur-vulcanisation system containing ENR-carbon black blends are cut and fed into a mould (dimension of the mould is also varied with the type of targeted application and testing). The mould together with the sulfur-vulcanisation system containing ENR-carbon black blend are sent for vulcanisation by using an electrical hot press machine with heating temperature 150±2° C., pressure 60 psi and duration based on the $T_{c90}$ (curing time to at least 90% of curing level) of each blend (as measured by a Monsanto's moving die typed rheometer). The $T_{c90}$ values of blends prepared by using the internal mechanical mixing method and open milling method are reported in Table 4 and 5 respectively.

TABLE 4

$T_{c90}$ of Sulfur-Vulcanisation System Containing ENR-Carbon Black Blends (Vulcanised at Temperature, 150 ± 2° C.) prepared by using the Internal Mechanical Mixing Method (according to Examples 1 and 2)

| ENR-Carbon Black Blend | $T_{c90}$ (minute) |
| --- | --- |
| Blend 1 | 6.20 |
| Blend 2 | 5.31 |
| Blend 3 | 5.20 |
| Blend 4 | 5.25 |
| Blend 5 | 5.08 |
| Blend 6 | 4.98 |
| Blend 7 | 4.95 |

TABLE 5

$T_{c90}$ of Sulfur-Vulcanisation System Containing ENR-Carbon Black Blends (Vulcanised at Temperature, 150 ± 2° C.) prepared by using the Open Milling Method (according to Examples 1 and 3)

| ENR-Carbon Black Blend | $T_{c90}$ (minute) |
| --- | --- |
| Blend 1 | 6.32 |
| Blend 2 | 5.41 |
| Blend 3 | 5.29 |
| Blend 4 | 5.35 |
| Blend 5 | 5.20 |

TABLE 5-continued $T_{c90}$ of Sulfur-Vulcanisation System Containing ENR-Carbon Black Blends (Vulcanised at Temperature, 150 ± 2° C.) prepared by using the Open Milling Method (according to Examples 1 and 3)

| ENR-Carbon Black Blend | $T_{c90}$ (minute) |
|---|---|
| Blend 6 | 5.07 |
| Blend 7 | 5.02 |

EXAMPLE 5

Electrical and Physical Properties of the Sulfur-vulcanised Epoxidised Natural Rubber [ENR]-Carbon Black Blends Sulfur-vulcanised ENR-carbon black blends prepared by using either the internal mechanical mixing method (as described in Examples 2 and 4) or open milling method (as described in Examples 3 and 4) have the orders of electrical volume resistance (measured using 2-probe technique with a Keithley 6157A Electrometer) as summarised in Table 6 and 7 respectively, which rendered the material suitable for antistatic footwear application and manufacturing.

TABLE 6

Orders of electrical volume resistance value (Ohms) for Sulfur-Vulcanised ENR-Carbon Black Blends prepared by using the Internal Mechanical Mixing Method (according to Examples 1, 2 and 4)

| ENR-Carbon Black Blend | Electrical Volume Resistance Order (Ohm) |
|---|---|
| Blend 1 | $\times 10^{10}$ |
| Blend 2 | $\times 10^{3}$ |
| Blend 3 | $\times 10^{1}$ |
| Blend 4 | $\times 10^{4}$ |
| Blend 5 | $\times 10^{5}$ |
| Blend 6 | $\times 10^{5}$ |
| Blend 7 | $\times 10^{4}$ |

TABLE 7

Orders of electrical volume resistance value (Ohms) for Sulfur-Vulcanised ENR-Carbon Black Blends prepared by using the Open Milling Method (according to Examples 1, 2 and 4)

| ENR-Carbon Black Blend | Electrical Volume Resistance Order (Ohm) |
|---|---|
| Blend 1 | $\times 10^{10}$ |
| Blend 2 | $\times 10^{3}$ |
| Blend 3 | $\times 10^{1}$ |
| Blend 4 | $\times 10^{4}$ |
| Blend 5 | $\times 10^{5}$ |
| Blend 6 | $\times 10^{5}$ |
| Blend 7 | $\times 10^{4}$ |

Sulfur-vulcanised ENR-carbon black blends prepared by using either the internal mechanical mixing method (described in Examples 2 and 4) or open milling method (described in Examples 3 and 4) exhibit Shore A hardness values as shown in Table 8 and 9 respectively.

TABLE 8

Shore A Hardness Values of Sulfur-Vulcanised ENR-Carbon Black Blends prepared by using the Internal Mechanical Mixing Method (according to Examples 1, 2 and 4)

| ENR-Carbon Black Blend | Hardness (Shore A) |
|---|---|
| Blend 1 | 41 ± 1 |
| Blend 2 | 55 ± 1 |
| Blend 3 | 63 ± 1 |
| Blend 4 | 59 ± 1 |
| Blend 5 | 70 ± 1 |
| Blend 6 | 75 ± 1 |
| Blend 7 | 79 ± 1 |

TABLE 9

Shore A Hardness Values of Sulfur-Vulcanised ENR-Carbon Black Blends prepared by using the Open Milling Method (according to Examples 1, 2 and 4)

| ENR-Carbon Black Blend | Hardness (Shore A) |
|---|---|
| Blend 1 | 42 ± 1 |
| Blend 2 | 54 ± 1 |
| Blend 3 | 62 ± 1 |
| Blend 4 | 58 ± 1 |
| Blend 5 | 70 ± 1 |
| Blend 6 | 74 ± 1 |
| Blend 7 | 78 ± 1 |

Sulfur-vulcanised ENR-carbon black blends prepared by using either the internal mechanical mixing method (as described in Examples 2 and 4) or open milling method (as described in Examples 3 and 4) have some main non-aged tensile properties (measured according to the standard, i.e. ISO 37) as shown in Table 10 and 11 respectively.

TABLE 10

Non-Aged Tensile Properties of Sulfur-Vulcanised ENR-Carbon Black Blends prepared by using the Internal Mechanical Mixing Method (according to Examples 1, 2 and 4)

| ENR-Carbon Black Blend | Tensile Strength (MPa) | Elongation at Break (%) |
|---|---|---|
| Blend 1 | 18.0 ± 0.5 | 456.5 ± 30.0 |
| Blend 2 | 23.8 ± 0.5 | 617.2 ± 30.0 |
| Blend 3 | 24.2 ± 0.5 | 619.8 ± 30.0 |
| Blend 4 | 22.0 ± 0.5 | 522.7 ± 30.0 |
| Blend 5 | 20.5 ± 0.5 | 497.3 ± 30.0 |
| Blend 6 | 19.8 ± 0.5 | 505.7 ± 30.0 |
| Blend 7 | 20.7 ± 0.5 | 515.4 ± 30.0 |

TABLE 11

Non-Aged Tensile Properties of Sulfur-Vulcanised ENR-Carbon Black Blends prepared by using the Open Milling Method (according to Examples 1, 2 and 4)

| ENR-Carbon Black Blend | Tensile Strength (MPa) | Elongation at Break (%) |
|---|---|---|
| Blend 1 | 17.6 ± 0.5 | 446.3 ± 30.0 |
| Blend 2 | 23.2 ± 0.5 | 605.0 ± 30.0 |
| Blend 3 | 23.9 ± 0.5 | 610.3 ± 30.0 |
| Blend 4 | 21.5 ± 0.5 | 513.2 ± 30.0 |
| Blend 5 | 20.1 ± 0.5 | 485.5 ± 30.0 |
| Blend 6 | 19.2 ± 0.5 | 497.7 ± 30.0 |
| Blend 7 | 20.3 ± 0.5 | 507.5 ± 30.0 |

Sulfur-vulcanised ENR-carbon black blends prepared by using either the internal mechanical mixing method (as described in Examples 2 and 4) or open milling method (as described in Examples 3 and 4) show crescent tear strength values (measured according to the standard, i.e. ISO 34) as reported in Table 12 and 13 respectively.

TABLE 12

Crescent Tear Strength Values of Sulfur-Vulcanised ENR-Carbon Black Blends prepared by using the Internal Mechanical Mixing Method (according to Examples 1, 2 and 4)

| ENR-Carbon Black Blend | Tear Strength (N/mm) |
| --- | --- |
| Blend 1 | 14.3 ± 1.0 |
| Blend 2 | 18.4 ± 1.0 |
| Blend 3 | 26.2 ± 1.0 |
| Blend 4 | 22.8 ± 1.0 |
| Blend 5 | 28.5 ± 1.0 |
| Blend 6 | 31.4 ± 1.0 |
| Blend 7 | 34.3 ± 1.0 |

TABLE 13

Crescent Tear Strength Values of Sulfur-Vulcanised ENR-Carbon Black Blends prepared by using the Open Milling Method (according to Examples 1, 2 and 4)

| ENR-Carbon Black Blend | Tear Strength (N/mm) |
| --- | --- |
| Blend 1 | 13.2 ± 1.0 |
| Blend 2 | 17.5 ± 1.0 |
| Blend 3 | 25.4 ± 1.0 |
| Blend 4 | 22.1 ± 1.0 |
| Blend 5 | 28.2 ± 1.0 |
| Blend 6 | 31.5 ± 1.0 |
| Blend 7 | 34.0 ± 1.0 |

Sulfur-vulcanised ENR-carbon black blends prepared by using either the internal mechanical mixing method (as described in Examples 2 and 4) or open milling method (as described in Examples 3 and 4) also show compression set values (measured according to Standard ISO 815 at 30 min) as reported in Table 14 and 15 respectively.

TABLE 14

Compression Set Values of Sulfur-Vulcanised ENR-Carbon Black Blends prepared by using the Internal Mechanical Mixing Method (according to Examples 1, 2 and 4)

| ENR-Carbon Black Blend | Compression Set (%) |
| --- | --- |
| Blend 1 | 16.3 ± 1.0 |
| Blend 2 | 27.8 ± 1.0 |
| Blend 3 | 28.9 ± 1.0 |
| Blend 4 | 25.4 ± 1.0 |
| Blend 5 | 30.0 ± 1.0 |
| Blend 6 | 33.1 ± 1.0 |
| Blend 7 | 35.2 ± 1.0 |

TABLE 15

Compression Set Values of Sulfur-Vulcanised ENR-Carbon Black Blends prepared by using the Open Milling Method (according to Examples 1, 2 and 4)

| ENR-Carbon Black Blend | Compression Set (%) |
| --- | --- |
| Blend 1 | 17.5 ± 1.0 |
| Blend 2 | 28.9 ± 1.0 |
| Blend 3 | 29.0 ± 1.0 |
| Blend 4 | 26.5 ± 1.0 |
| Blend 5 | 31.0 ± 1.0 |
| Blend 6 | 34.4 ± 1.0 |
| Blend 7 | 36.0 ± 1.0 |

Sulfur-vulcanised ENR-carbon black blends prepared by using either the internal mechanical mixing method (as described in Examples 2 and 4) or open milling method (as described in Example 3 and 4) also exhibit Dunlop rebound resilience values (measured according to Standard BS 903 Part A8) as reported in Table 16 and 17 respectively. Damping properties of the ENR-carbon black blends always enhanced with their decreasing rebound resilience values.

TABLE 16

Dunlop Rebound Resilience Values of Sulfur-Vulcanised ENR-Carbon Black Blends prepared by using the Internal Mechanical Mixing Method (according to Examples 1, 2 and 4)

| ENR-Carbon Black Blend | Dunlop Rebound Resilience (%) |
| --- | --- |
| Blend 1 | 47.8 ± 1.0 |
| Blend 2 | 42.0 ± 1.0 |
| Blend 3 | 33.6 ± 1.0 |
| Blend 4 | 38.6 ± 1.0 |
| Blend 5 | 28.8 ± 1.0 |
| Blend 6 | 21.6 ± 1.0 |
| Blend 7 | 20.8 ± 1.0 |

TABLE 17

Dunlop Rebound Resilience Values of Sulfur-Vulcanised ENR-Carbon Black Blends prepared by using the Open Milling Method (according to Examples 1, 2 and 4)

| ENR-Carbon Black Blend | Dunlop Rebound Resilience (%) |
| --- | --- |
| Blend 1 | 48.4 ± 1.0 |
| Blend 2 | 42.5 ± 1.0 |
| Blend 3 | 34.3 ± 1.0 |
| Blend 4 | 39.2 ± 1.0 |
| Blend 5 | 29.3 ± 1.0 |
| Blend 6 | 22.3 ± 1.0 |
| Blend 7 | 20.9 ± 1.0 |

Sulfur-vulcanised ENR-carbon black blends prepared by using either the internal mechanical mixing method (as described in Examples 2 and 4) or open milling method (as described in Examples 3 and 4) show Akron abrasion values (measured according to Standard BS 903 Part A9) as reported in Table 18 and 19 respectively.

TABLE 18

Akron Abrasion Values of Sulfur-Vulcanised ENR-Carbon Black Blends prepared by using the Internal Mechanical Mixing Method (according to Examples 1, 2 and 4)

| ENR-Carbon Black Blend | Akron Abrasion (mm$^3$/500 rev) |
| --- | --- |
| Blend 1 | 30 ± 1 |
| Blend 2 | 25 ± 1 |
| Blend 3 | 21 ± 1 |
| Blend 4 | 24 ± 1 |

TABLE 18-continued

Akron Abrasion Values of Sulfur-Vulcanised ENR-Carbon Black Blends prepared by using the Internal Mechanical Mixing Method (according to Examples 1, 2 and 4)

| ENR-Carbon Black Blend | Akron Abrasion (mm³/500 rev) |
| --- | --- |
| Blend 5 | 14 ± 1 |
| Blend 6 | 10 ± 1 |
| Blend 7 | 8 ± 1 |

TABLE 19

Akron Abrasion Values of Sulfur-Vulcanised ENR-Carbon Black Blends prepared by using the Open Milling Method (according to Examples 1, 2 and 4)

| ENR-Carbon Black Blend | Akron Abrasion (mm³/500 rev) |
| --- | --- |
| Blend 1 | 31 ± 1 |
| Blend 2 | 26 ± 1 |
| Blend 3 | 22 ± 1 |
| Blend 4 | 24 ± 1 |
| Blend 5 | 14 ± 1 |
| Blend 6 | 11 ± 1 |
| Blend 7 | 8 ± 1 |

The invention being thus described, it will be apparent that the same may be varied in many ways. Such variations are to be regarded as within the scope of the invention, and all such modifications as would be apparent to one skilled in the art are intended to be within the scope of the following claims.

The invention claimed is:

1. A method for preparation of epoxidized natural rubber based blend for antistatic footwear application and manufacturing comprising: epoxidized natural rubber, carbon blacks, antioxidants, processing oils, processing waxes and vulcanisation agents wherein the method comprises the steps of:
   (a) adding epoxidized natural rubber to an internal mechanical mixing device;
   (b) mixing of epoxidized natural rubber with carbon blacks, processing oils, processing waxes, and antioxidants by using the internal mechanical mixing device to produce masterbatch;
   (c) discharge of the masterbatch from the internal mechanical mixing device;
   (d) mixing of masterbatch with vulcanisation agents by using an open milling device to produce blend;
   (e) discharging the blend from the open milling device; and
   (f) vulcanisation of the blend by heating or microwave.

2. The method according to claim 1, wherein step (b) further comprising the step of adding vulcanisation activators.

3. The method according to claim 1 wherein step (d) further comprises the step of adding either vulcanisation accelerators or vulcanisation coagents or whitening agents or in any combination thereof.

4. A method for preparation of epoxidized natural rubber based blend for antistatic footwear application and manufacturing comprising: epoxidized natural rubber, carbon blacks, antioxidants, processing oils, processing waxes and vulcanisation agents wherein the method comprises the steps of:
   (a) adding of epoxidized natural rubber to an open milling device;
   (b) mixing of epoxidized natural rubber with carbon blacks, processing oils, processing waxes, antioxidants by using the open milling device to produce masterbatch;
   (c) mixing of the masterbatch with vulcanisation agents by using the open milling device to produce blend;
   (d) discharge of the blend from the open milling device; and
   (e) vulcanisation of the blend by heating or microwave.

5. The method according to claim 4, wherein step (b) further comprising the step of adding vulcanisation activators to the masterbatch.

6. The method according to claim 4, wherein step (c) further comprising the step of adding either vulcanisation accelerators or vulcanisation coagents or whitening agents or in any combination thereof.

7. The method according to claim 1, wherein the vulcanisation process of the ENR based blends are performed at temperature ranges from 100-250° C. by either heating or microwave.

8. The method for preparation of epoxidized natural rubber based blend according to claim 1, wherein the epoxidized natural rubber based blend composition comprises:
   50.0 to 150.0 part per hundred rubber [p.p.h.r.] of epoxidized natural rubber;
   5.0 to 60.0 p.p.h.r. of carbon blacks;
   0.1 to 20.0 p.p.h.r. of antioxidants with a purity level of 80.0-100.0 wt %;
   1.0 to 60.0 p.p.h.r. of processing oils;
   0.05 to 20.0 p.p.h.r. of processing waxes;
   0.1 to 10.0 p.p.h.r. of vulcanisation agent with a purity level of 30.0-100.0 wt %.

9. The method for preparation of epoxidized natural rubber based blend according to claim 1, wherein the epoxidized natural rubber based blend further comprises:
   vulcanisation accelerators added in step (b) with a purity level of 80.0-100.0 wt %;
   vulcanisation activators added in step (d) with a purity level of 80.0-100.0 wt %; and
   vulcanisation coagents added in step (d).

10. The method for preparation of epoxidized natural rubber based blend according to claim 1, wherein the epoxidized natural rubber based blend comprises vulcanisation accelerators, vulcanisation activators and vulcanisation coagents in order to accelerate, activate and enhance the epoxidized natural rubber based blends vulcanisation process.

11. The method for preparation of epoxidized natural rubber based blend according to claim 1, wherein the epoxidized natural rubber based blend further comprises whitening agents added in step (d) in order to adjust its black colour level.

12. The method for preparation of epoxidized natural rubber based blend according to claim 1, wherein whitening agents are added in step (d) and have a purity level of 80.0-100.0 wt %.

13. The method according to claim 5 wherein step (c) further comprises the step of adding either vulcanisation accelerators or vulcanisation coagents or whitening agents or in any combination thereof.

14. The method for preparation of epoxidized natural rubber based blend according to claim 4, wherein the epoxidized natural rubber based blend composition comprises:

50.0 to 150.0 part per hundred rubber [p.p.h.r.] of epoxidized natural rubber;

5.0 to 60.0 p.p.h.r. of carbon blacks;

0.1 to 20.0 p.p.h.r. of antioxidants with a purity level of 80.0-100.0 wt %;

1.0 to 60.0 p.p.h.r. of processing oils;

0.05 to 20.0 p.p.h.r. of processing waxes;

0.1 to 10.0 p.p.h.r. of vulcanisation agent with a purity level of 30.0-100.0 wt.

15. The method for preparation of epoxidized natural rubber based blend according to claim 4, wherein the epoxidized natural rubber based blend further comprises:

vulcanisation accelerators added in step (b) with a purity level of 80.0-100.0 wt %;

vulcanisation activators added in step (c) with a purity level of 80.0-100.0 wt %; and vulcanisation coagents added in step (c).

16. The method for preparation of epoxidized natural rubber based blend according to claim 4, wherein the epoxidized natural rubber based blend further comprises vulcanisation accelerators, vulcanisation activators and vulcanisation coagents in order to accelerate, activate and enhance the epoxidized natural rubber based blends vulcanisation process.

17. The method for preparation of epoxidized natural rubber based blend according to claim 4, wherein the epoxidized natural rubber based blend further comprises whitening agents added in step (c) in order to adjust its black colour level.

18. The method for preparation of epoxidized natural rubber based blend according to claim 4, wherein whitening agents are added in step (c) and have a purity level of 80.0-100.0 wt %.

19. The method according to claim 5, wherein step (c) further comprising the step of adding either vulcanisation accelerators or vulcanisation coagents or whitening agents or in any combination thereof.

20. The method according to claim 4, wherein the vulcanisation process of the ENR based blends are performed at temperature ranges from 100-250° C. by either heating or microwave.

* * * * *